(12) United States Patent
Redford et al.

(10) Patent No.: US 10,344,189 B2
(45) Date of Patent: Jul. 9, 2019

(54) CONDUCTIVE ADHESIVES

(71) Applicant: CONPART AS, Skjetten (NO)

(72) Inventors: Keith Redford, Hagan (NO); Helge Kristiansen, Oslo (NO)

(73) Assignee: Conpart AS, Skjetten (NO)

( * ) Notice: Subject to any disclaimer, the term of this patent is extended or adjusted under 35 U.S.C. 154(b) by 398 days.

(21) Appl. No.: 14/414,145

(22) PCT Filed: Jul. 12, 2013

(86) PCT No.: PCT/EP2013/064838
§ 371 (c)(1),
(2) Date: Jan. 12, 2015

(87) PCT Pub. No.: WO2014/009552
PCT Pub. Date: Jan. 16, 2014

(65) Prior Publication Data
US 2015/0175851 A1  Jun. 25, 2015

(30) Foreign Application Priority Data
Jul. 12, 2013 (GB) .................................. 1212489.7

(51) Int. Cl.
C09J 9/02 (2006.01)
B32B 41/00 (2006.01)
H01R 4/04 (2006.01)

(52) U.S. Cl.
CPC ................. C09J 9/02 (2013.01); B32B 41/00 (2013.01); H01R 4/04 (2013.01); B32B 2307/202 (2013.01); Y10T 428/25 (2015.01)

(58) Field of Classification Search
None
See application file for complete search history.

(56) References Cited

U.S. PATENT DOCUMENTS 4,338,173 A   6/1982   Ugelstad
4,459,378 A   7/1984   Ugelstad
(Continued)

FOREIGN PATENT DOCUMENTS

CN   1537180    10/2004
JP   H04010304   1/1992
(Continued)

OTHER PUBLICATIONS

Machine translation JP-2003317826-A (Year: 2003).*
(Continued)

Primary Examiner — Alexandre F Ferre
(74) Attorney, Agent, or Firm — Gardner Groff Greenwald & Villanueva, PC

(57) ABSTRACT

A conductive adhesive, such as an anisotropic conductive adhesive, comprising a population of conductive particles and a population of signal particles in an adhesive; wherein both the conductive particle population and the signal particle population have an average particle diameter of <200 µm with a coefficient of variance of <10%; wherein the signal particles are arranged to provide an indication when they are deformed to a pre-determined height; and wherein the conductive particles are arranged such that they will not fail, e.g. crack or fracture, when deformed to a height larger than or equal to the pre-determined height at which the signal particles are arranged to provide the indication.

22 Claims, 1 Drawing Sheet

(56) References Cited

U.S. PATENT DOCUMENTS

| | | | |
|---|---|---|---|
| 5,120,665 A | 6/1992 | Tsukagoshi | |
| 5,676,925 A | 10/1997 | Klaveness et al. | |
| 5,955,143 A | 9/1999 | Wheatley et al. | |
| 5,965,064 A | 10/1999 | Yamada et al. | |
| 6,787,233 B1 | 9/2004 | Molteberg et al. | |
| 6,942,824 B1 | 9/2005 | Li | |
| 7,045,050 B2 | 5/2006 | Tanaka et al. | |
| 2004/0234763 A1 | 11/2004 | Atsushi | |
| 2007/0295943 A1* | 12/2007 | Jun | H01B 1/22 252/512 |
| 2010/0080995 A1 | 4/2010 | Ishimatsu | |
| 2010/0264553 A1* | 10/2010 | Wainerdi | H01L 24/29 257/783 |

FOREIGN PATENT DOCUMENTS

| | | | |
|---|---|---|---|
| JP | 2003249287 | | 5/2003 |
| JP | 2003249287 | | 9/2003 |
| JP | 2003317826 A | * | 11/2003 |
| JP | 2004095269 | | 3/2004 |
| KR | 20090073558 A | * | 7/2009 |
| KR | 20110048100 A | * | 5/2011 |
| WO | 1993002112 | | 2/1993 |
| WO | 2000061647 | | 10/2000 |
| WO | 2014009562 | | 1/2014 |

OTHER PUBLICATIONS

Machine translation KR-20090073558-A (Year: 2009).*
Machine translation KR-20110048100-A (Year: 2011).*
Chinese First Office Action for 201380047530.5 dated Aug. 11, 2016 (translation, 13 pages).
International Search Report for PCT/EP2013/064838 dated May 8, 2014.
Great Britain Search Report for GB1212489.7 dated Nov. 13, 2012.
He., J.Y. et al. "Mechanical properties of nanostructured polymer particles for anisotropic conductive adhesives," Int. J. Mat. Res., 2007, 98:389-392.
He, J. et al. "Physical properties of metal coated polymer particles for anisotropic conductive adhesive," NSTI-Nanotech, 2009, 1:262-265.

* cited by examiner

CONDUCTIVE ADHESIVES

IN THE CROSS-REFERENCE TO RELATED APPLICATIONS

This application is a U.S. national phase application under 35 USC 371 of international application number PCT/EP2013/064838, filed Jul. 12, 2013, which claims priority to Great Britain Application No. 1212489.7, filed Jul. 13, 2012, which is hereby incorporated herein by reference in its entirety for all purposes.

The present invention relates to improvements in conductive adhesives, in particular to improvements that enable determination of when optimum bonding process parameters have been applied during bonding. More specifically, the invention relates to an adhesive having particles that indicate when an optimum deformation of conductive particles has or will be achieved during bonding.

BACKGROUND

Conductive adhesives, comprising conductive particles in an adhesive base, are well known. They have many applications but are particularly useful in the manufacture of electronic devices to provide adhesion and electrical connection between components such as in liquid crystal displays (LCDs), LCD screens and driver electronics.

Anisotropic conductive adhesives (ACA) and anisotropic conductive films (ACF) that pass electricity along only one axis provide electrical connection in many critical electronic systems. This approach can replace traditional methods, like soldering, and can provide connectivity where conventional technologies often fail. ACA/ACF also facilitate a more efficient use of the board 'real estate' as well as more flexible and reliable interconnects. Typical ACA pastes contain electrically conductive metallic particles (typically metal-coated polymer particles), ranging in size from 2 to 50 micrometers, incorporated in an insulating binder. Larger particles are used in applications such as "Flip Chip", where an unprotected device is mounted "face down" onto the interconnect board.

ACA/ACF is widely used in the electronics industry, and has become the de-facto standard for the interconnect of driver electronics to displays for LCD manufacturing. The ACA/ACF is applied to a substrate, and the component is then placed accurately on the substrate so that the contacts on the component and substrate align. A force is applied and at the same time the curing process of the adhesive is activated. This could be by any of a number of methods, including contact heating, infra-red heating, microwave heating or UV light. During this process, conductive particles are trapped between the mating contact bumps. To minimise the amount of voids in the final adhesive connection, an excess of adhesive is used which must be squeezed out during the bonding process. Due to the strongly time and temperature dependent properties of the adhesive caused by the on-going curing, it is immensely difficult to predict the right combination of force, time and temperature that will correctly squeeze out the right amount of adhesive and leave the particles with the correct amount of deformation after the finished bonding. These parameters have to be adjusted by experiments and in some cases even monitored continuously during manufacturing, but it is still very difficult to get this right. Thus, determining the correct process parameters that provide the correct amount of deformation of the contact particles is a problem.

Over the years, the LCD industry has developed a technique based on optical inspection of the bonded particles. As the particles are to some extent brittle, they will crack when the deformation reaches certain levels. The particles have a significant variation in size and mechanical properties (due to lack of homogeneity in the manufacturing process), and due to this variation, there will be a wide variation in the diameter at which the particles fail when they are deformed (termed here the "crack point"). Because of this wide distribution of crack points a population of particles will gradually crack as pressure is applied and the particles are deformed (e.g. compressed). The technique assumes that the desired amount of deformation has been achieved when a certain (small) percentage of the particles have cracked. The remaining uncracked particles then provide conductivity. The process parameters (e.g. pressure and temperature) at this point are then taken to be the correct parameters to apply.

In practice, components are applied to the substrate, cured and the fraction of particles between the contacts that are cracked or crushed is determined. A nominal fraction, for example 10 to 20%, is used as an indication that a desired deformation has been achieved, e.g. sufficient pressure has been applied. Less than this fraction and the pressure was too low to give optimum contact. More than this and the pressure was too high. Thus, by inspecting the fraction of particles that are cracked or crushed, the bonding process window can be estimated. In cases where the substrate is transparent, such as in the case of LCD manufacturing, it is straightforward to inspect the cracked particles. In other cases it is more difficult.

The present inventors have however recognised a problem with this technique. As electronic devices become smaller and smaller, the size of and pitch between contacts also becomes smaller and the conductive particle size used in the conductive adhesive becomes smaller. As LCD technology develops, the display resolution and pixel count continues to increase, consequently the pitch between contacts becomes smaller and thus the polymer-core sizes of the conductive particles have progressively reduced. At the same time, the cost of the driver ICs is strongly dependent on the silicon area of the IC, which today is defined by the pad size and the number of pads. Using smaller particles will allow smaller pads (or more contacts per pad), and will therefore significantly reduce the cost of the driver ICs.

For the smallest particle sizes in particular, there are significant advantages in having extremely small size distributions of the particles. Whereas previously, a coefficient of variation (CV) of 10% was adequate, CVs of <5%, preferably <3% or even <2% are now desired.

CV is defined as: CV=100×standard deviation of diameter/average diameter

At the same time, a better control and homogeneity of the mechanical properties of the particles are needed, to fulfil the reliability requirements of the new generation of ACF materials.

In LCD technology, the LCD glass is flat on a sub-micron level. The main planarity issue has typically been with the contact-bumps on the chips themselves. However, it is now becoming feasible to planarize the bumps by mechanical means (lapping) on the wafer level, with the resultant situation being that all pad substrate distances become very uniform. Hence, particle homogeneity becomes the critical aspect.

The very small distribution of size and mechanical properties in the latest generation of particles means that there is also a very small distribution of crack points. In other words, all the particles tend to crack when they are deformed (compressed) to an almost identical size. The applicant, Conpart AS, manufacture particles with an extreme homogeneity of crackpoints, as documented in the following paper: He J Y, Zhang Z L, Kristiansen H. Int J Mater Res 2007; 98:389-92. Therefore even if such particles are deformed very slowly (e.g. pressure is slowly applied), the particles will all tend to crack at the same point. This makes it practically impossible to allow just a small percentage to crack in order to estimate when desired deformation has been achieved whilst allowing the majority of particles to remain intact. In other words, the lack of particle-to-particle variation combined with the uniformity of substrate and pad-planarity makes it near impossible to establish a usable process window based on fracture of the particles.

Thus, the industry's need for smaller particles with better and more homogenous performance, and hence a very small distribution of stress and strain at failure, is not compatible with the current methods for determining a reasonable process window. This problem will hamper the development of ACF technology in future because it will become more and more difficult to achieve the correct amount of deformation of the particles.

Moreover, the current method can only provide an approximate indication of the bonding process window, it does not clearly identify the point at which the desired deformation has been achieved (which will vary from batch to batch of particles). The present inventors have devised a new process for determining the optimum bonding pressure in order to secure two substrates together using conductive adhesives even using particles with low coefficient of variation. The technique relies on the use of a small population of signal particles in combination with the conductive adhesive particles, the signal particles indicating when an optimum bonding pressure has been applied before the conductive particles themselves are damaged, e.g. through cracking

SUMMARY OF INVENTION

According to a first aspect, the present invention provides a conductive adhesive comprising a population of conductive particles and a population of signal particles in an adhesive;

wherein both the conductive particle population and the signal particle population have an average particle diameter of <200 µm, preferably <50 µm with a coefficient of variance (CV) of <10%;

wherein the signal particles are arranged to provide an indication when they are deformed to a pre-determined height; and wherein the conductive particles are arranged such that they will not fail, e.g. crack or fracture, when deformed to a height larger than or equal to the pre-determined height at which the signal particles are arranged to provide the indication.

In other words, the signal particles provide an indication when they are subject to a smaller compressive deformation (i.e. when a smaller compressive deformation is applied) than the compressive deformation at which the conductive particles fail.

Viewed from another aspect the invention provides an anisotropic conductive film comprising a conductive adhesive as hereinbefore defined, e.g. an anisotropic conductive film comprising a conductive adhesive sandwiched between a top cover layer and bottom carrier layer.

Definitions

As used herein, "Applying deformation" means to apply some force to the conductive adhesive that pushes it towards the substrate during the bonding process (before the adhesive has reached its fully cured state) that squeezes out excessive adhesive and deforms the particles. The applied deformation to the particles or the amount that the particles deform is a result of the applied force (or pressure) during the bonding process. The deformation applied to the particle is a complex function of a number of parameters including the magnitude of the applied force (or pressure), the chip size, pad layout, pad dimensions (including height) and temperature and temperature gradients used in the bonding process (through the viscosity and curing behaviour of the adhesive matrix). A smaller applied deformation, however, typically corresponds to a smaller applied pressure.

Where heights are discussed herein, it is the height of the particle (i.e. the diameter) in the direction of the deformation, e.g. in the direction that pressure is applied, that is meant. As an example, the pre-determined height to which an initially spherical signal particle is deformed means the height in the direction that pressure was applied. That predetermined height will obviously be smaller than the initiator spherical diameter of the particle.

DETAILED DESCRIPTION OF INVENTION

The conductive adhesive is preferably an ACA, such as an ACF. Ideally, the adhesive material is a thermosetting or thermoplastic resin or rubber. Thermosetting resins are preferred. Possible thermosetting resins are for example, synthetic resins, such as, epoxy resins, melamine resins, phenol resins, diallyl phthalate resin, bismaleimidotriazine resin, polyesters, cyanoacrylates, polyurethanes, phenoxy resins, polyamides and polyimides; and rubbers and elastomers containing functional group(s), such as hydroxy, carboxyl, vinyl, amino or epoxy. Among them, epoxy resins are especially preferred.

Preferred epoxy resins are those based on bisphenol type, epoxynovolak resins and those made from epoxy compounds having in the molecule two or more oxirane groups.

It will be appreciated that the conductive particles and signal particles are arranged in a planar layer within the conductive adhesive. Ideally, that layer contains a single layer of particles, i.e. the particles are not stacked on top of each other but form a single layer. This forms a further aspect of the invention. The particles can be packed so that the particles in use will bond to appropriate locations with the bonding layers.

Whilst the concentration of particles within the adhesive is typically below the percolation threshold, it is also possible for the concentration of particles to be above the percolation threshold (i.e. a non anisotropic adhesive). The introduction of signal particles in a planar single layer comprising conductive particles is highly advantageous, especially where the percolation threshold is exceeded, and improves upon the invention of, for example, U.S. Pat. No. 6,942,824.

An ACF may be provided with a carrier layer and top layer to protect the adhesive before use and is often provided in a reel. The carrier and top layers are conventional, e.g. paper.

When particles deform, the shape will change, and may be described as a bulging cylinder with flat portions top and bottom. For example, a particle that is initially spherical and is deformed may become cylindrical with a height in the direction that the deformation is applied that is less than the original diameter and a circular bulge extending at either side that is larger than the original diameter.

Preferably, the signal and conductive particles are initially spherical.

The pre-determined height at which the signal particles are arranged to provide an indication preferably corresponds to the ideal amount of deformation of the conductive particles at which an optimum combination of conductivity and contact stability under reliability testing is achieved, which in turn corresponds to the ideal gap between the contacting bonding pads. The ideal amount of deformation should preferably be determined experimentally for each combination of conductive particle and adhesive matrix.

The signal particles should thereafter be chosen such that they give a clear indication once that optimum deformation is reached. It can thus be determined that the amount of applied deformation when the signal particles provide the indication is the correct amount of deformation to be applied to the conductive particles. For example, half or more than half of the signal particles should provide the necessary indication. In some embodiments all particles will indicate.

This amount of applied deformation will correspond to particular bonding process parameters (e.g. pressure and temperature), which are therefore the correct bonding process parameters to apply in order to maximise bonding of the conductive adhesive particles to the substrates. Because the conductive particles will not fail, e.g. crack, unless they are deformed to a smaller height than the height at which the signal particles provide the indication, the indication of the signal particles reveals the correct bonding process parameters without straining the conductive particles close to the crack point.

The indication that the signal particles are arranged to provide once they have been deformed to a predetermined height can be any suitable indication that can be recognised by a user or a control system. In a preferred embodiment, the indication is the failure (cracking) of the signal particles. Thus, the signal particles are arranged to fail when they are deformed to a pre-determined height. In another embodiment, the indication is the release or exposure of a coloured dye. A dye may be released when a particle is deformed but before it completely fails. Or, a dye may only be released when a particle completely fails. In this case, the indication can be both the failure of the signal particles and the release of a dye. The dye can therefore assist in detecting failed signal particles. Coloured dyes are discussed in more detail below. Such indications may be detected by the process machinery and/or may be observed by a user.

In one embodiment, a second or further populations of signal particles may be included, that are arranged to provide an indication when they are deformed to a pre-determined height different to the first signal particles. These could indicate a particular degree of deformation (e.g. compression) or an optimal range of deformation. For example the second population of signal particles could be arranged to provide an indication when they are deformed to a pre-determined height smaller than the height at which the first signal particles provide an indication but larger than the height at which the conductive particles would fail. The indication provided by the first signal particles may indicate that a minimum deformation (e.g. minimum pressure) has been applied that achieves optimum deformation of the conductive particles, whilst the indication provided by the second signal particles may indicate that a maximum applied deformation (e.g. maximum pressure) has been exceeded that achieves optimum deformation of the conductive particles. The optimum deformation of the conductive particles can then be shown as occurring during the interval between when the primary signal particles provide an indication up until the second signal particles provide an indication. In this way the optimum range of process parameters can be determined without coming close to the cracking deformation of the conductive particles.

For a conductive particle with diameter $D_{cond}$ and an optimum deformation (determined theoretically or experimentally as described) equal to a [%], the ideal gap, $h_{opt}$, between the pads will be $$h_{opt} = D_{cond}\left(1 - \frac{a}{100}\right).$$

The larger the deformation of the particle, the smaller the final gap, h. A process window around the optimum deformation can be given by a−Δ≤d≤a+Δ, where d represents the allowed deformation degree, and Δ is a suitable number determined by practical experiments. With two populations of signal particles, these should be chosen such that one will provide an indication at a height of $$h_{max} = D_{cond}\left(1 - \frac{(a-\Delta)}{100}\right)$$

and the other at $$h_{min} = D_{cond}\left(1 - \frac{(a+\Delta)}{100}\right).$$

This variation in the height at which the particles provide an indication can be obtained by using particles with the same indication process and particle properties, but with two different diameters. Alternatively different particle properties can be designed.

In one example, optimum deformation of the conductive particle is found to be 40 to 60%, such as about 50%. For example, if optimum deformation for the conductive particles is 50% then these might be combined with signal particles that are arranged to provide an indication at 60% deformation. With one population of signal particles, these particles will be chosen to have a diameter 25% larger than the conductive particles as then the signal particles will indicate at exactly the 50% deformation height for the conductive particles, In general, the diameter of the signal particle should be chosen such that $$D_{sign} = D_{cond}\left(\frac{1-a}{1-b}\right),$$

where a represents the optimum deformation of the conductive particle, and b represents the deformation at which the indication is provided by the signal particle.

In one embodiment, cracking is the indicator mechanism. In another embodiment, the signal and conductive particles may be made of the same material, and cracking of the particle is the indicator process.

In another embodiment, the chemical composition of the signal particles is different to that of the conductive particles, such that the signal particles crack when they are deformed to the same degree, which represents the optimum deformation degree of the conductive particles. In this embodiment the conductive and signal particles can have the same initial diameter as one another.

The cracking indication may involve the whole particle or perhaps just the cracking of a coating present on the signal particle. In another embodiment, the indicator process might be cracking of a non transparent surface coating (metal or other) to reveal the polymer core of the signal particle. The polymer core can be coloured to simplify the recognition of the coating cracking. The polymer core may therefore fluoresce and so on.

In one example, the signal particles may have a chemical composition that cause the particles to indicate when they reduced in height by up to 30% of their initial height, whereas the conductive particles may have a chemical composition that cause the particles to fail when they reduced in height by the deformation pressure by 50% or more. In other words, the signal particles are more fragile than the conductive particles.

Some signal particles of the invention may even offer two separate indications, e.g. corresponding to the cracking of a shell on a particle and the cracking of the particle as a whole. There may be two events on the compression curve of a metal plated particle, for example. One where a crack forms in the metal coating and a second one where there is total failure of the particle. If, for example, a metal coating is provided with a dye, the dye might indicate at a first point before total particle failure offers a second indication.

In yet another embodiment, two different populations of signal particles will be used to indicate both the upper (a+Δ) and lower (a−Δ) limit of optimum deformation.

The conductive particles and signal particles used in this invention are preferably formed from a core/shell type polymer particle structure. The actual polymer core is not itself new. Polymer particles which can be used in this invention can be made following the teaching of, inter alia, WO93/02112 and WO00/61647. In general, polymer particles based on styrenics, acrylates, urethanes, epoxides or phenolics can be used here. Moreover, suitable starting polymer particles are commercially available from suppliers such a Conpart AS, Norway.

The polymer particles of use in the invention are typically formed from a core particle which can be manufactured by known techniques such as emulsion polymerisation, dispersion polymerisation and suspension polymerisation from a seed particle. These techniques are well known in the art. It is especially preferred if an Ugelstad activated swelling technique is employed to manufacture the core particles. The Ugelstad process is an "activated swelling" process rather than a suspension polymerization because polymerization is only initiated after all the monomer has been absorbed into the starting polymer seeds. In a seeded suspension polymerization the growing seed is continuously contacted with fresh monomer and initiator.

The Ugelstad (Sintef) process is described in U.S. Pat. Nos. 4,336,173 and 4,459,378 although particles can also simply be bought from suppliers. Monodisperse polymer particles produced by the Sintef process are sold commercially under the trade name Dynospheres®, typically with mode particle sizes in the range 2 to 60 μm. It is preferred if the particles used in this invention are monodisperse.

In general therefore, this technology is well known and particles can be purchased commercially from the likes of Life Technologies AS.

The core particles can be formed from a variety of different monomers. It will be preferred if the particle is also cross-linked. Typically, most of the monomers used will be monofunctional vinyl monomers, and crosslinking of the particles is obtained by using a polyfunctional vinyl monomer.

Another option is particles prepared from acrylic acid esters, methacrylic acid esters, acrylic acids, methacrylic acids, acrylonitrile, methacrylonitrile, vinyl chloride, vinyl acetate and vinyl propionate. Mixtures of any of these monomers can also be used optionally together with the styrene monomers above.

Seed particles may, for example, be prepared from styrene, e.g. styrene crosslinked with divinylbenzene or acrylates. Other styrene monomers of use in the invention include methylstyrene and vinyl toluene. Mixtures of styrene monomers may be used. All monomers can be crosslinked with divinylbenzene or acrylic esters of difunctional alcohols such as ethanedioldiacrylate. Some particles may require treatment with base to hydrolyse ester groups to allow cross-linking. The use of a cross-linked polymer particle is preferred.

Some monomers may comprise epoxy groups such as glycidyl methacrylate. The skilled man is able to select the monomer combination and cross-linker he wants using his general knowledge.

Preferred polymer particles according to the invention comprise a styrene, an acrylate or a methacrylate seed. Highly preferred monomers therefore include acrylic acid, butyl acrylate, 2-ethylhexyl acrylate, methyl acrylate, ethyl acrylate, acrylonitrile, methyl methacrylate and trimethylolpropane triacrylate (TMPTA). Preferred crosslinkers include diacrylates and methacrylates of ethylene glycol, propylene glycol, $C_4$ diols, $C_5$ diols and $C_6$ diols. For example hexanedioldiacrylate is particularly preferred.

Functionalised monomers of interest include mono or multiply ethylenically unsaturated monomers such as acrylic acid esters, methacrylate esters, acrylic acid, methacrylic acid, acrylonitrile, methacrylonitrile and vinyl propionate.

The use of acrylic and methacrylic acids and esters thereof is especially preferred. Such compounds include methyl, ethyl, propyl, butyl, or glycidyl acrylic acid esters and methyl, ethyl, propyl, butyl, or glycidyl methacrylates.

In a preferred embodiment, a seed polymer particle may be produced that can be swollen by an ionisable liquid. It is highly preferred if this seed polymer particle is functionalised. By functionalised is meant that an ionisable group is introduced into the polymer seed. This ionisable group may be present as part of the monomer used to form the seed or it may be introduced by post treatment of the seed.

Thus, ionisable groups may be introduced through the monomer used for seed preparation, and if necessary these groups may be temporarily protected during seed formation. The use of esters for example allows the formation of carboxylic acids upon ester hydrolysis. The use of acrylic acids provides an ionisable carboxyl group in the polymer seed.

Alternatively, a seed particle can be contacted with an external agent such as acid or a base to introduce ionisable groups. Suitable external agents include phosphoric acid or sulphuric acid.

Suitable ionisable groups include acid groups such as sulphonic acid groups, phosphonic acid groups or carboxylic acid groups.

The introduction of an ionisable group provides a hydrophilic environment making seeds water swellable and also able to absorb the monomers discussed below. Moreover, these groups serve to catalyse the polymerisation of the aromatic compound and aldehyde monomer within the polymer seed as described below.

The polymer seeds, preferably functionalised polymer seeds, may then be swollen with monomers and those monomers polymerized within the seed so as to form the polymer particles of the invention. Suitable polymer particles comprise a seed swelled with an aromatic alcohol/aldehyde blend such as a phenol/formaldehyde, or seed swelled with an aromatic amine/aldehyde blend such as melamine/formaldehyde and wherein the monomers are polymerised within the seed. The use of monomers containing ester groups, epoxy groups and acid groups is also contemplated.

Further reactive monomers of interest include furfurylalcohol, furfural, furfurylalcohol-formaldehyde, phenol-furfural, phenol-furfuryl-alcohol, resorcinol formaldehyde, cresol-formaldehyde, phenol-formaldehyde, urea-formaldehyde, melamine-formaldehyde, epoxy compounds, epoxy-amine compounds and diisocyanate-polyhydroxy compound systems.

The aldehyde of use in the invention is preferably a $C_{1-6}$ alkanal, or furfural, especially a $C_{1-4}$-alkanal. The seed is preferably swelled with an aromatic alcohol compound in combination with a formaldehyde or with an aromatic amine compound in combination with formaldehyde.

The term aromatic is used herein to cover either an aryl compound or heteroaryl compound containing at least one heteroatom selected from N, O or S. It is preferred if the aromatic group is 5 or 6-membered in the ring. Preferred aryl groups include $C_{6-10}$ aryl groups, especially those containing a benzene ring.

Any aromatic alcohol can have one or more hydroxyl groups, e.g. 1 to 3, especially 1 or 2 hydroxyl groups directly bound to the aromatic ring. Any aromatic amine can have one or more amino groups, e.g. 1 to 3, especially 1 or 2 amino groups.

The aryl alcohol compound can contain one or more hydroxyl groups, especially two or more hydroxyl groups. Suitable aryl alcohols include phenol, resorcinol and cresol.

Preferred aryl amine compounds include aniline or diaminobenzene.

Heteroaryl groups of particular interest include 5 or 6 membered nitrogen heterocycles or 5 or 6 membered oxygen heterocycles. Suitable heteroaryl alcohols include furfuryl. Preferred heteroaryl amine compounds are melamine. Most preferably the seed particles contain resorcinol formaldehyde polymers or epoxy functionalised polymers.

Once swollen with these compounds, a polymerisation is effected within the seed particle which results in the seed swelling much more. The volume of the seed particle typically increases by many times. The polymerisation reaction is achieved simply by heating the particle. The temperature employed is typically around 60 to 80° C. As noted above however, the ionisable groups within the seed help catalyst this polymerisation process.

It will be appreciated therefore that the monomers will react with each other to form a polymer and hence what is contained within the particle is really a polymer thereof (there may of course be some unreacted monomer too).

It is highly preferred if an acrylate or methacrylate seed particle is employed, the ionisable groups present are sulphonic acids groups and a resorcinol formaldehyde or melamine formaldehyde polymer is swelled in the seed.

It is also highly preferred if a styrene/divinyl benzene seed particle is employed, the ionisable groups present are sulphonic acids groups and a resorcinol formaldehyde or melamine formaldehyde polymer is swelled in the seed.

These polymer core particles are described in WO93/02112 which is herein incorporated by reference.

The conductive particles may then be provided with a shell. For conductive particles, such a coating is preferably a metal coating. Polymer particles can be coated using conventional coating methods, such as those described in U.S. Pat. No. 6,787,233.

Suitable metal coating layers can be formed from transition metals or a metal such as Bi, Si, Sb, Sn, Pb, Ga, Ge, In or Al or mixtures thereof. Metals of particular interest include gold, chromium, bismuth, indium, zinc and antimony. Especially preferably the metal may be selected from Ni, Cu, Pd and Ag, preferably Ni. Mixtures of these metals, e.g. Ni/Cu can also be used.

In particular a lead free solder may be employed in one or more layers of the coating. Lead free solders in commercial use may contain tin, copper, silver, bismuth, indium, zinc, antimony, and traces of other metals. Sn—Ag—Cu solders are especially preferred.

The combinations nickel/gold, nickel/palladium, and copper/nickel are preferred along with metals silver, gold, palladium, platinum and chromium.

Preferably the thickness of any coating layer is in the range 5-200 nm. The total thickness of any coating layers may be 5 nm to 5 micron. It is preferred if the total thickness is in the range 5 nm to 2 micron, especially preferably 5 nm to 1 micron.

The polymer particles can be coated according to methods known in the art. Such methods include electroplating, electroless plating, barrel coating, sputtering and vapour deposition. Mixtures of these methods may also be employed.

The coating provided on the particle can be monolayer or multilayer. Preferably the particle comprises a plurality of metal layers. Where multiple coating layers are present it is within the scope of the invention for different coating application methods to be involved in the formation of each layer. In particular the method of electroless plating is the preferred method. For subsequent layers substitution plating may be applied. For larger particles electroplating may be preferred.

Electroless plating is a method of depositing a metal on to a substrate using a process of chemical reduction. The advantage of this type of deposit is that the coating is uniform with hardly any variance in the distribution of thickness across the component.

It may be beneficial to heat-treat the as-deposited electroless plated coating to improve hardness.

Electroplating is a plating process that uses electrical current to reduce cations of a desired metal from a solution and coat an object with a thin layer of the metal. Electroplating can be used to build up coating thickness on a conducting base layer.

Substitution plating is where a more noble metal replaces a pre deposited metal where the existing metal is oxidized and goes into solution and the more noble metal is reduced. For example nickel metal and a gold salt such as $KAu(CN)_2$ In a multilayer coating, it is preferred if the layer adjacent the actual polymer particle comprises nickel, copper or silver, especially silver or nickel. This layer is preferably applied by electroless coating. It is preferred if the top layer comprises Sn, in particular comprises lead free solder, palladium or gold. The top layer is preferably one that resists oxidation. The most preferred top layer is Ag, Pd or Au ideally having a thickness in the range 5-2000 nm. Preferably the top layer has a thickness in the range 5-50 nm.

A highly preferred structure involves a Ni layer adjacent the polymer particle and a top layer containing, Pd, Ag or Au. Such a polymer particle may have other intermediate layers.

Any intermediate layers preferably comprise copper or nickel. It is obviously beneficial to use as much low-cost metal and as little expensive metal as possible in the invention.

The use of two layers is preferred. It will be appreciated that the different layers can be formed from the same or different metals. If the same metal is used to form multiple layers in may be impossible to distinguish those layers. If layers are indistinguishable then the particle will present simply as having a thicker monolayer made up by multiple depositions. Where the same metal is deposited by different techniques, such layers are often distinguishable.

The signal particles may or may not be conducting themselves. They will generally however be provided with a coating such as one made from another polymer material, glass, metal oxide, metal or mixture thereof. Signal particles may however just be formed from the core particle as described above and a coating layer discussed in more detail below, e.g. comprising an indicator. Coating thicknesses for the signal particles may be in the range 5-2000 nm.

In one preferred embodiment, the conductive and/or signal particles further comprise an outer insulating coating. The insulating coating prevents an electrical connection between particles that randomly happen to lay together in the adhesive. However, when a particle is mechanically deformed between two electrodes the insulation "fails" and enables conduction. This means that the adhesive can contain more particles, and any "accidental" daisy chains of particles between adjacent electrodes will not result in short circuits.

As an alternative to these core shell type polymer particles it may be possible to employ hollow polymer particles such as those described in U.S. Pat. Nos. 5,955,143, 5,676,925 and others. These particles can be made by dissolving a film-forming polymer in a volatile non aqueous solvent; dispersing into the polymer solution finely divided particles of a volatilizable solid core material; inducing formation of a solid polymer coating on the particulate solid core material in the non aqueous liquid mixture to produce polymer microcapsules having an encapsulated core of particulate core material; recovering the polymer microcapsules from the non aqueous liquid mixture; and removing the encapsulated core material from the microcapsules to make hollow polymer microcapsules. Dye-filled polymer microcapsules can then be made.

The monomers used are the same as those described above in connection with core particles.

These hollow particles can be provided with dye, pigment or fluorescent compounds as herein described which will release when the particle cracks under deformation pressure.

Preferably, the coefficient of variance (CV) of the conductive particles is <5%, such as <3%, especially <2.5%, e.g. <2%. Ranges of interest include 1.5 to <5%.

Preferably, the coefficient of variance (CV) of the signal particles is <5%, such as <3%, especially <2.5%, e.g. <2%. Ranges of interest include 1.5 to <5%. The signal particles are preferably added to the adhesive in small quantities.

The signal particle population may comprise from 1 to 50%, such as 1-30% of the total particles in the adhesive, preferably from 5-25%, more preferably from 10-20%, more preferably from 13-17%.

Alternatively viewed, the signal particles are preferably added to the adhesive in small quantities relative to the conductive particles. The signal particle population may comprise from 1 to 50 wt %, such as 1-30 wt % of the total particles in the adhesive, preferably from 5-25 wt %, more preferably from 10-20 wt %, more preferably from 13-17 wt %.

Preferred particles sizes for the conductive particles are 1 to 50 microns, such as 2 to 20 microns, especially 2 to 10 microns, e.g. 3 to 5 microns.

Preferred particles sizes for the signal particles are 5 to 50 microns, such as 2 to 20 microns.

It will be appreciated that as the conductive adhesive, when compressed between component and pad, contains a single, but not complete, particle layer, the thickness of the conductive adhesive is essentially the same as the thickness of the partially compressed particles themselves The number of particles present in the adhesive can of course vary but there is typically a large weight excess of adhesive material over total particles content. The conductive particles might form up to 20 vol % of the combination of adhesive and particles combined, such as up to 15 vol %. The presence of an insulating layer on the conductive and signal particles may allow higher volume percentages to be employed, e.g. possibly up to 50 vol %.

As can be seen from the above, the present invention requires the optimum deformation of the conductive particles to be predetermined, since the signal particles are arranged to give a clear signal when they are deformed to that specific diameter.

Several methods can be used to determine the optimum deformation of the conductive particles. One is to look into single particle behaviour and determine the point where cracking of the metal coating on a conductive particle is initiated (reference to: He J Y, Zhang Z L, Helland T, Kristiansen H, Physical properties of metal coated polymer particles for Anisotropic Conductive Adhesive. Proceedings of NSTI Nanotech 2009, 2009; p 262-265). With that knowledge, an optimum deformation can be determined as being less (but close to) that deformation pressure.

Another method is to measure the electrical contact resistance of individual particles as a function of deformation. Again, the highest conductivity can be found and used to determine the optimum deformation height subject of course to no cracking of the particles.

A third method is to evaluate the reliability of the adhesive when exposed to temperature cycling and/or humidity testing as a function of different deformation degrees. Different deformation degrees are obtained by varying the bonding force (for a set temperature and time) and the deformation degree can be measured using either a range of different signal particles or by other experimental techniques (cross-sectioning, IR microscopy etc.) Too much latent strain in the deformed particles can result in detrimental long term effects such as cracking, delamination etc. Too little deformation and hence too little pressure coupled with temperature cycling can result in loss of contact between bonding layers. Repeated temperature cycling and/or humidity testing as a function of different deformation degrees can allow determination of optimum deformation height to avoid these failures.

It is envisaged that during deformation, the failure of the signal particles can be observed. However, to simplify the detection of cracked signal particles, these may be given certain properties. Preferably, the signal particles comprise a colour such as a first dye, pigment or fluorescing (which includes phosfluorescing herein) component which is exposed and can be observed when the particle fails. Ideally, the colour can be contained in the particle and will only be visible when the particle cracks. The signal particles may comprise a shell comprising polymer, glass, metal oxide, metal or a combination thereof, and wherein the dyes, pigments or fluorescing components is contained within this shell. One example of a suitable fluorescing component is anthracene or any other dye, pigment or fluorescing material.

As discussed above, in one embodiment a further population of signal particles are included that are arranged to clearly indicate when they are deformed to a pre-determined diameter different to the first signal particles. Again, fracturing of the particles is a preferred indication method here. These second signal particles can also comprise a dye, pigment or fluorescing component, which is preferably a different colour to that of the first signal particles. Thus, for example, the colour of the first signal particles may signal the minimum deformation (e.g. pressure) required to achieve optimum deformation of the conductive particles, whilst the colour of the second signal particles may indicate the maximum deformation (e.g. pressure). Thus, once the second signal particle colour has been observed too much pressure has been applied.

In addition to the signal particles, the conductive particles may also be provided with a dye, pigment or fluorescing component. If too much deformation was applied such that the conductive particles fail, this would be indicated by the release of the conductive particle colour. It will be appreciated that the colours used in the signal particle populations and conductive particles, if present should be distinguishable.

Signal particles comprising a dye, pigment or fluorescing component which is exposed when the particle fails or cracks, is seen as an invention in its own right. Thus, according to a second aspect, the present invention provides a polymer particle with a diameter<200 μm, the particle comprising a first dye, pigment or fluorescing component which is exposed when the particle is deformed such that it gives an indication, e.g. by cracking, that sufficient deformation is reached.

Alternatively viewed, the invention provides a population of polymer particles with a diameter<200 μm and a CV of less than 10%, the particles comprising a first dye, pigment or fluorescing component which is exposed when the particles are deformed such that they give an indication, e.g. by cracking, that sufficient deformation is reached.

The particle may comprise a shell comprising polymer, glass, metal oxide, metal or a combination thereof, and wherein the dye, pigment or fluorescing component is contained within this shell. The particle may comprise an outer insulating coating. Alternatively, the particle may be a hollow particle as hereinbefore described. The invention also provides a conductive adhesive comprising a plurality of such particles comprising a dye, pigment or fluorescing component. Other preferred properties of the signal particles discussed above may also be utilised with this aspect of the invention.

The conductive adhesive of the invention can be used in any suitable way to determine when the correct amount of deformation of the conductive particles has occurred, e.g. when the correct bonding pressure has been applied. However, according to one particular aspect of the invention there is a provided a method of determining when conductive particles in a conductive adhesive have been deformed to a pre-determined desired height, comprising:

applying to a substrate a conductive adhesive comprising a population of conductive particles and a population of signal particles, wherein the signal particles are arranged to indicate when they are deformed to a pre-determined height and the conductive particles are arranged such that they will not fail, e.g. crack or fracture, unless they are further deformed to a smaller height;

applying deformation to the adhesive such that at least some of the signal particles indicate;

inspecting the conductive adhesive to determine when a pre-defined proportion of the signal particles have failed; and determining, when the pre-defined proportion of particles has indicated, that the conductive particles have been deformed to the pre-determined desired height.

Preferably, the pre-determined height at which the signal particles are arranged to indicate corresponds to the desired deformed height of the conductive particles and thus the desired spacing between the substrate and a surface to be bonded thereto, e.g. an electrode on a component to be affixed to the substrate by the conductive adhesive.

Thus, the applied bonding process parameters, e.g. pressure and temperature, at which the pre-defined proportion of signal particles has indicated, are therefore the correct process parameters for the conductive particles.

Preferably in this method none (or very few) of the conductive particles fail. All (or most) of the signal particle population can indicate. Thus, preferably at least 50%, such as at leas 75% of the signal particles indicate.

The conductive adhesive may further comprise a second population of signal particles arranged to indicate when they are deformed to a pre-determined height smaller than the failure diameter of the first signal particles but larger than the failure height of the conductive particles, and the method may further comprise the steps of applying deformation to the adhesive such that none or some of the second population of signal particles indicate; inspecting the conductive adhesive to determine when a pre-defined proportion of the second signal particles have failed; and determining, when the pre-defined proportion of second signal particles has failed, that the deformation should cease to be applied.

The previously described preferred features of the conductive and signal particles are also applicable to this aspect of the invention, alone or in combination.

This method of determining when conductive particles in a conductive adhesive have been deformed to a pre-determined desired diameter may be used each time surfaces are bonded, e.g. components are connected, using a conductive adhesive. Alternatively, it may be used to calibrate a machine prior to actually bonding surfaces using a conductive adhesive. The conductive adhesive may be in the form of a reel of ACF, in which case calibration may take place at the start of each reel of ACF, with the same process parameters then being used for the rest of the reel. In this case, conductive particles need not actually be present in the adhesive used during machine calibration.

Thus, according to a further aspect, the present invention provides a method of calibrating a machine for bonding surfaces using a conductive adhesive, comprising: applying to a substrate an adhesive comprising a population of signal particles that are arranged to indicate when they are deformed to a pre-determined height; applying deformation to the adhesive such that at least some of the signal particles indicate; inspecting the adhesive to determine when a pre-defined proportion of the signal particles have indicated; and determining the desired deformation to apply as being that which causes the pre-determined proportion of signal particles to indicate.

The previously described preferred features of the signal particles, such as that they may comprise a dye, are also applicable to this aspect of the invention alone or in combination.

An adhesive comprising signal particles but not necessarily conductive particles also forms part of the invention. According to a further aspect, the present invention provides an adhesive comprising a population of signal particles; wherein the signal particles have an average particle diameter of <200 µm with a coefficient of variance of <10%, preferably <5%, such as <3%, especially <2.5%, e.g. <2% wherein the signal particles are arranged to indicate when they are deformed to a pre-determined diameter that corresponds to an optimum deformation to apply to the adhesive.

According to a further aspect of the present invention, there is provided a method of manufacturing a conductive adhesive, comprising:

mixing conductive particles and signal particles with an adhesive, wherein both the conductive particles and the signal particles have an average particle diameter of <200 µm with a coefficient of variance of <10%;

wherein the signal particles are arranged to indicate when they are deformed to a pre-determined height;

wherein the conductive particles are arranged such that they will not fail unless they are deformed to a height smaller than the pre-determined diameter at which the signal particles are arranged to indicate.

According to yet another aspect of the present invention, there is provided a method of manufacturing a signal particle, comprising:

soaking a polymer bead with a diameter<200 µm in a solution comprising a dye, pigment or fluorescing component; and providing the polymer bead with a shell comprising polymer, glass, metal oxide, metal or a combination thereof;

wherein the outer shell is arranged to crack when the particle is deformed, such that the dye, pigment or fluorescing component is exposed. Alternatively, the dye, pigment or fluorescing component might be added before or during the polymerisation process to form the actual polymer particle.

The invention also provides a method of manufacturing a signal particle, comprising:

polymerising a mixture of monomers in the presence of a dye, pigment or fluorescing component to form polymer beads with a diameter<200 µm; and providing the polymer beads with an outer shell comprising polymer, glass, metal oxide, metal or a combination thereof;

wherein the outer shell is arranged to crack when the particle is deformed, such that the dye, pigment or fluorescing component is exposed.

Once the predetermined pressure has been applied, the actual bonding process between two substrates is carried out as is well known in the art. Thus, the adhesive can be cured to ensure bonding.

Preferred embodiments of the present invention will now be described by way of example only and with reference to the accompanying drawings, in which.

Figure 1:
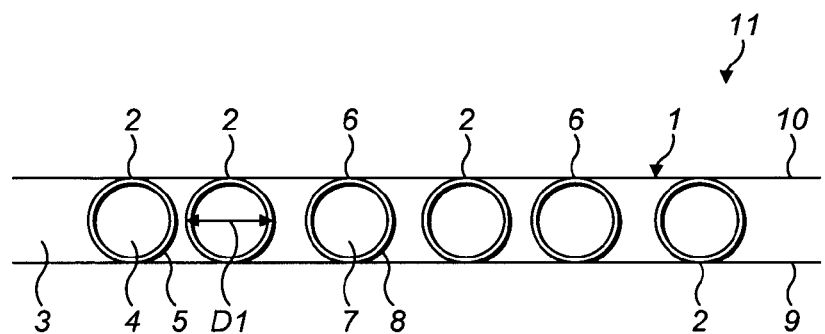
FIG. 1 illustrates an anisotropic conductive adhesive film according to an embodiment of the present invention.

An anisotropic conductive adhesive film (ACF) 1 according to an embodiment of the present invention is illustrated in FIG. 1. The ACF film will typically be thicker than the diameter of the particles, e.g. 20 microns. During the deformation process, the film is compressed down to the thickness of the particles and the excess adhesive gets pushed out.

A population of conductive particles 2 are mixed with an adhesive 3 comprising a resin and hardener, each conductive particle having a polymer core 4 with a conductive metal coating 5. In one example the core 4 comprises styrene divinyl benzene copolymer. In another, the core comprises methyl methacrylate—butyl acrylate—ethyleneglycol diacrylate terpolymer. The coating 5 comprises layers of nickel and gold, nickel/palladium, silver or nickel. Each conductive particle 2 has a diameter Dl, with the average diameter being 10 µm with a coefficient of variance of <5%.

A population of signal particles 6 are also mixed with the adhesive 3, with the signal particles 6 comprising 10% of the total particles in the adhesive. In this embodiment the signal particles comprise a polymer core 7 comprising a different copolymer composition to particle core 4 and an anthracene dye within a metal coating 8.

The signal particles 6 also have an average diameter of 10 µm with a coefficient of variance of <5%. However, the composition of the signal particles 6 is chosen such that they will indicate when they are deformed to a pre-determined diameter which corresponds to the optimum amount of deformation of the conductive particles 2. The optimum deformation is determined by analysing when the metal coating on a conductive particle cracks and setting the optimum deformation to near but less than this point. High deformation without cracking maximises conductivity.

In this embodiment, the average conductive particle diameter is 10 µm. When optimally deformed the conductive particle may have a height of 6 µm. Therefore, the signal particles 6 are arranged to indicate when they are deformed to a height of 6 µm.

The composition of the signal particles 6 is such that they will not indicate unless they are deformed to a pre-determined height that represents the optimum deformation of the conductive (primary) particle, i.e. in this illustration 6 µm.

The ACF 1 is laid down in an even thickness on a carrier film 9, with a cover film 10 over the top, to form an ACF tape 11.

The ACF tape 11 is supplied as a reel. In use, the tape is cut to the required length, the cover film 10 is removed and the tape 11 is applied to a substrate 12. A pre-bonding (or pre-tacking) is performed to attach the ACF to the substrate 12 using typically a temperature of 80-100° C. and a force of 0.1-1 MPa.

Figure 2:
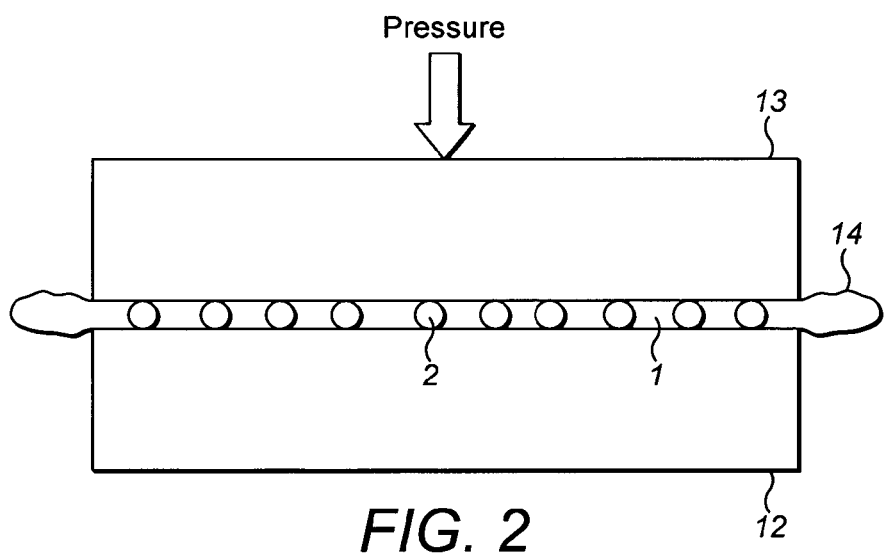
FIG. 2 illustrates a substrate and component bonded together using an anisotropic conductive adhesive film according to an embodiment of the invention.

After pre-bonding, the carrier film 9 is removed and replaced with the desired second bonding surface. The bonding of the components is performed at elevated temperature (typically 170° C. or higher) and high pressure (typically 50-150 MPa (calculated from bond-pad area)), depending on the area of the electrodes (bumps) on the component and the pads on the substrate. During this bonding process the bumps of the electrodes penetrate into the adhesive film 1 and become fully immersed in the adhesive. Then, the surface of the chip 13 to be adhered thereto is pressed into the adhesive and excessive adhesive 14 is pressed out from between the chip 13 and the substrate 12. FIG. 2 illustrates the chip 13 and substrate 12 sandwiched together with the ACF 1 (this Figure is not to scale, the ACF 1 is shown much larger than in reality). At this stage the conductive particles 2 and signal particles 6 in the adhesive are subject to pressure and are deformed. When they reach the pre-determined level of deformation, the signal particles 6 indicate: the coating cracks and the core fractures, and the dye is released, which is observed. Fibre-optics are provided on the machine that carries out the adhesion process, to illuminate the adhesive so that the dye can be observed. If the colouring agent is fluorescent then the illumination will cause the agent to fluoresce. Fibre-optics may provide illumination through a transparent substrate, or may provide illumination from the side. The latter case enables colour to be observed in the case of non-transparent substrates, such as PCBs.

Exposure of the dye indicates that the correct amount of deformation, thus pressure, has been applied to the ACF 1, such that the conductive particles 2 are at optimum deformation. Accordingly, no further pressure is applied and adhesion is complete on full cure.

It will be appreciated that a machine used for bonding two surfaces can therefore be provided with a mechanism of detecting the indication and a means of feeding back that detection to the system responsible for applying deformation pressure/temperature adjustment and so on so that once indication has occurred, no further deformation pressure is applied and instead the curing reaction completes the bonding process.

The above describes the situation where an actual component is adhered to a substrate using the ACF. If instead the ACF was used to calibrate a machine before use, a test component can be used. Most likely this component is a special dummy or more likely a real component just used for calibration as this has the perfect pad layout and dimensions.

Figure 3:
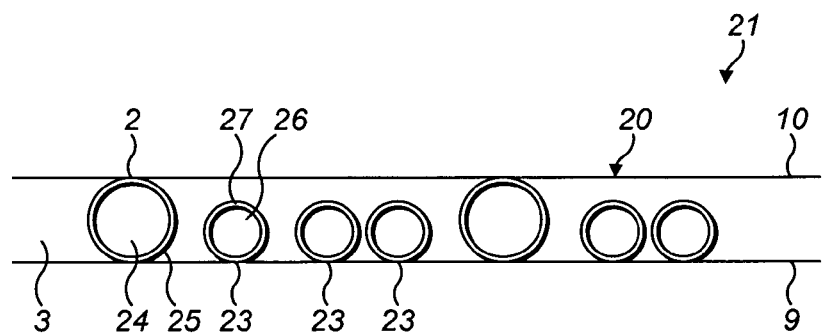
FIG. 3 illustrates an anisotropic conductive adhesive film according to a further embodiment of the present invention.

A conductive adhesive 20 according to a different embodiment of the invention is shown in FIG. 3. In this embodiment, signal particles 22 have a larger diameter than conductive particles 23. The core 24 of the signal particles 22 is made of the same material as the core 26 of the conductive particles 23, and similarly the outer coating 25 of the signal particles 22 is the same material as the outer coating 27 of the conductive particles 23. The signal and conductive particles will thus have the same deformation properties. However, since the signal particles 22 are larger than the conductive particles 23, they will initiate deformation earlier in the bonding process and always be more deformed than the conductive (primary) particles. They will thus break before the conductive particles. The relative sizes of the signal and conductive particles are chosen such that the signal particles 22 will crack when the optimum deformation of the conductive particles 23 has been achieved.

The signal particles 6 according to an embodiment of the invention are manufactured by soaking polymer beads 7 in a solution of anthracene. The beads absorb the colour, and are then removed from the solution and plated with nickel and gold by electroless plating.

The invention claimed is:

1. A conductive adhesive comprising a population of conductive particles and a population of signal particles in an adhesive;
   wherein the signal particles comprise a dye, pigment, or fluorescing component that is exposed when the signal particle cracks;
   wherein both the conductive particle population and the signal particle population have an average particle diameter of <200 μm with a coefficient of variance of <10%;
   wherein the signal particles are particles that will crack to provide an indication comprising the exposure of the dye, pigment, or fluorescing component when they are deformed to a pre-determined height;
   wherein each of the conductive particles is arranged such that it will not fail unless it is deformed to a height less than the pre-determined height at which the signal particles will crack to provide the indication; and
   wherein the height of each signal particle is the diameter of the signal particle measured in a direction of deformation of the signal particle, and the height of each conductive particle is the diameter of the conductive particle measured in a direction of deformation of the conductive particle, wherein the direction of deformation is the direction in which pressure is applied.

2. A conductive adhesive as claimed in claim 1, wherein the coefficient of variance of the diameter of the conductive particles is <5%.

3. A conductive adhesive as claimed in claim 1, wherein the coefficient of variance of the diameter of the signal particles is <5%.

4. A conductive adhesive as claimed in claim 1, wherein the signal particle population comprises from 1-30 wt % of the total particles in the adhesive.

5. A conductive adhesive as claimed in claim 1, further comprising a second population of signal particles that are arranged to indicate when they are deformed to a pre-determined height smaller than the pre-determined height at which the population of signal particles are arranged to indicate.

6. A conductive adhesive as claimed in claim 5, wherein the second population of signal particles comprises a core surrounded by a shell, the shell comprising polymer, glass, metal oxide, metal or a combination thereof, and wherein a dye, pigment or fluorescing component is contained within this shell and is exposed when the particle cracks.

7. A conductive adhesive as claimed in claim 1, wherein the average diameter of the signal particle population is larger than the average diameter of the conductive particle population.

8. A conductive adhesive as claimed in claim 1, wherein the average diameter of the signal particle population is 20 to 50% larger than the average diameter of the conductive particle population.

9. A conductive adhesive as claimed in claim 1, wherein the chemical composition of the conductive particles is different to that of the signal particles, such that the mechanical properties of the conductive particles are different to those of the signal particles in order that the height at which the signal particles will crack is larger than the height at which the conductive particles fail when they are deformed.

10. A conductive adhesive as claimed in claim 1, wherein the signal particles will crack when they are reduced in height by up to 30% of their initial height, whereas the conductive particles fail when they are reduced in height by a deformation pressure by 50% or more.

11. A conductive adhesive as claimed in claim 1, wherein the signal particles and/or conductive particles comprise an insulating coating on the outside of the particles.

12. A conductive adhesive as claimed in claim 1, wherein the signal particles comprise a core surrounded by a shell, the shell comprising polymer, glass, metal oxide, metal or a combination thereof, and wherein the dye, pigment or fluorescing component is contained within this shell.

13. A conductive adhesive as claimed in claim 1 wherein the particles are present in a single layer within the adhesive.

14. An anisotropic conductive film comprising a conductive adhesive as claimed in claim 1, sandwiched between a top cover layer and bottom carrier layer.

15. A conductive adhesive as claimed in claim 1, wherein the signal particle is a polymer particle.

16. A conductive adhesive as claimed in claim 1, wherein the dye, pigment, or fluorescing component is only visible when the dye, pigment, or fluorescing component is exposed when the signal particle cracks.

17. A method of determining when conductive particles in a conductive adhesive have been deformed to a desired height, comprising:
   applying to a substrate the conductive adhesive of claim 1;
   applying deformation to the conductive adhesive such that at least some of the signal particles crack to provide the indication;
   inspecting the conductive adhesive to determine when a pre-defined proportion of the signal particles have cracked; and
   determining, when the pre-defined proportion of the signal particles has cracked, that the conductive particles have been deformed to the desired height.

18. A method as claimed in claim 17 wherein the desired height is established by:
   (I) determining the point where cracking of a metal coating on said conductive particles begins and assessing the desired height to correspond to less than the height at which said cracking occurs; or
   (II) measuring the electrical contact resistance of a conductive particle as a function of deformation and establishing the desired height as corresponding to the lowest electrical contact resistance without cracking of the conductive particle; or
   (III) exposing the conductive particles to temperature cycling and/or humidity testing as a function of different deformation force.

19. A method as claimed in claim 17 wherein said cracking is detected by a mechanism for detecting the indication, wherein the indication is fed back to a system responsible for applying deformation to the conductive adhesive to prevent further increases in deformation.

20. A method as claimed in claim 17, wherein the pre-determined height at which the signal particles are arranged to crack corresponds to the desired height of the conductive particles.

21. A method of calibrating a machine for bonding surfaces using a conductive adhesive, comprising:
   applying to a substrate the adhesive of claim 1;
   applying deformation to the adhesive such that at least some of the signal particles crack to provide the indication;
   inspecting the adhesive to determine when a pre-defined proportion of the signal particles have cracked; and
   determining the desired deformation to apply that causes the pre-determined proportion of signal particles to crack.

22. A method of manufacturing a conductive adhesive of claim 1, comprising:
   mixing a population of conductive particles and a population of signal particles with an adhesive,
wherein both the conductive particle population and the signal particle population have an average particle diameter of <200 μm with a coefficient of variance of <10%, wherein the signal particles comprise a dye, pigment, or fluorescing component that is exposed when the signal particle cracks;
   wherein the signal particles are particles that will crack to provide an indication comprising the exposure of the dye, pigment, or fluorescing component when they are deformed to a pre-determined height;
   wherein each of the conductive particles is arranged such that it will not fail unless it is deformed to a height less than the pre-determined height at which the signal particles will crack to provide the indication; and
   wherein the height of each signal particle is the diameter of the signal particle measured in a direction of deformation of the signal particle, and the height of each conductive particle is the diameter of the conductive particle measured in a direction of deformation of the conductive particle, wherein the direction of deformation is the direction in which pressure is applied.

* * * * *